United States Patent [19]

Lane et al.

[11] Patent Number: 4,613,444

[45] Date of Patent: Sep. 23, 1986

[54] REVERSIBLE PHASE CHANGE COMPOSITIONS OF CALCIUM CHLORIDE HEXAHYDRATE WITH POTASSIUM CHLORIDE

[75] Inventors: George A. Lane; Harold E. Rossow, both of Midland, Mich.

[73] Assignee: The Dow Chemical Company, Midland, Mich.

[21] Appl. No.: 364,159

[22] Filed: Mar. 31, 1982

[30] Foreign Application Priority Data

Apr. 15, 1981 [JP] Japan ................. 56-055719

[51] Int. Cl.$^4$ ................. C09K 5/06
[52] U.S. Cl. ................. 252/70; 126/400; 165/10 A; 165/104.11; 165/104.17
[58] Field of Search ................. 252/70; 126/400; 165/10 A, 104.11, 104.17, DIG. 4

[56] References Cited

U.S. PATENT DOCUMENTS

| | | | |
|---|---|---|---|
| 2,706,716 | 4/1955 | Howe et al. | 159/1.1 |
| 3,958,101 | 5/1976 | Barabas | 252/70 |
| 4,119,556 | 10/1978 | Chubb | 252/70 |
| 4,272,391 | 6/1981 | Lane et al. | 252/70 |
| 4,272,392 | 6/1981 | Lane et al. | 252/70 |
| 4,273,666 | 6/1981 | Lane et al. | 252/70 |
| 4,299,274 | 11/1981 | Campbell | 252/70 |
| 4,392,971 | 7/1983 | Kimura et al. | 252/70 |

FOREIGN PATENT DOCUMENTS

| | | | |
|---|---|---|---|
| 11357 | 5/1980 | European Pat. Off. | 252/70 |
| 13569 | 7/1980 | European Pat. Off. | 252/70 |
| 2550106 | 5/1976 | Fed. Rep. of Germany . | |
| 43387 | 11/1974 | Japan . | |
| 70193 | 6/1976 | Japan . | |
| 76183 | 7/1976 | Japan . | |
| 84386 | 6/1980 | Japan | 252/70 |
| 38879 | 3/1982 | Japan | 252/70 |
| 96079 | 6/1982 | Japan | 252/70 |
| 2001096A | 1/1979 | United Kingdom . | |
| 568669 | 8/1977 | U.S.S.R. | 252/70 |

OTHER PUBLICATIONS

Chem Abstracts, vol. 86; 123744d, "Composite Heat Preserver", Japan Kokai 76-126,980, Nov. 1976.
*General Chemistry Applications*, Week A30, p. 17, "Heat Storing Compsn for Heating Rooms" J5 3070-989, Seki E33.
Yoneda, N. et al., "Eutetic Mixtures for Solar Heat Storage", Solar Energy, Vol. 21, pp. 61-63, 1978.

*Primary Examiner*—John E. Kittle
*Assistant Examiner*—Robert A. Wax

[57] ABSTRACT

A reversible liquid/solid phase change composition comprising a mixture of hydrated $CaCl_2$ and KCl in which the KCl modifies the semi-congruently melting behavior of $CaCl_2.6H_2O$ to the extent that the mixture approaches congruent melting behavior. The composition preferably includes nucleating additives to modify and suppress the supercooling properties of the liquid phase of the composition. The composition most preferably comprises an admixture of hydrated $CaCl_2$ and KCl having an amount of NaCl and/or $SrCl_2.6H_2O$ as an additive sufficient to obtain an effectively congruently melting mixture.

43 Claims, No Drawings

REVERSIBLE PHASE CHANGE COMPOSITIONS OF CALCIUM CHLORIDE HEXAHYDRATE WITH POTASSIUM CHLORIDE

BACKGROUND OF THE INVENTION

Phase change materials (PCM's) in which the heat of fusion of various hydrated salt compositions is employed are well known in the literature. In the ASHRAE Journal of September, 1974, entitled SOLAR ENERGY STORAGE, Dr. M. Telkes evaluated the thermal, physical and other pertinent properties of PCM's on the basis of economics, applicability, corrosion, toxicity and availability for large scale installations. Among the materials evaluated were various salt hydrates and their eutectics including $CaCl_2.6H_2O$ which undergoes several phase transitions to materials of different crystal structure, i.e. $CaCl_2.6H_2O$ to $CaCl_2.4H_2O + 2H_2O$ at 29° C.

When heated to a temperature of above 33° C., the salt $CaCl_2.6H_2O$ dissolves completely in its water of crystallization. When cooled, formation of four different crystal forms is possible, i.e., $CaCl_2.6H_2O$ and three forms of $CaCl_2.4H_2O$. If any of the $4H_2O$ crystals form, the heat of fusion is much less than 46 cal/gm ($CaCl_2.6H_2O$ in substantially pure form undergoes a liquid/solid phase transition at about 30° C. releasing or alternately absorbing about 46 calories of heat per gram). Despite the relatively low cost of $CaCl_2$, the formation of its four different crystal forms was deemed to be disadvantageous.

Carlsson et al., in Swedish Pat. No. 410,004, claim a method for suppressing the tetrahydrate formation during repeated melting and crystallization of a system based on $CaCl_2.6H_2O$. In a comparative study, Carlsson et al., determined that in solutions in the concentration range of from 48 to 53 weight percent $CaCl_2$, using $CaCl_2.6H_2O$ of highest purity, the crystallization temperatures for $CaCl_2.6H_2O$ and $CaCl_2.4H_2O$ where such that the solution was incongruently melting and that $CaCl_2.4H_2O$ crystallized and precipitated out of the solution thus losing its heat storage capacity. By using a solution of the same concentration from $CaCl_2$ of technical grade (Road Salt) containing NaCl and KCl as impurities, the solubility of the tetrahydrate decreased and that of the hexahydrate increased and on repeated melting and crystallization, the precipitation becomes significant and the system again loses its heat storage capacity. Thus, the conclusion can be drawn that the use of technical grade $CaCl_2$ (Road Salt) results in a poorer performance due to a relative increase in tetrahydrate formation as compared to a system based on high purity $CaCl_2$. Carlsson et al., discovered that the addition of one or more compounds, including about 2 weight percent $SrCl_2.6H_2O$, increased the solubility of the tetrahydrate and suppressed tetrahydrate formation on repeated melting and crystallization. The amount of addition was found to be dependent upon the amount of impurities present in the system, which in an example using Road Salt was determined to be 2.2 weight percent.

The relative amounts of each impurity in the technical grade salt (Road Salt) was not determined nor was it held to be important to the outcome of the tests conducted. In fact, the use of Road Salt was found to be less desirable from the standpoint of tetrahydrate formation compared to $CaCl_2$ of high purity. Neither was there any recognition by Carlsson et al., that impurities of NaCl and KCl in the composition could be beneficial in reducing tetrahydrate crystal formation in such phase change compositions.

Heat storage compositions are ideally packaged in individual encapsulating means for use in conjunction with solar heating systems. Exemplary of suitable known encapsulating means for the heat storage compositions herein described are water impervious films or foils of plastic/metal laminates. Closed cell plastic foams have also been suggested in which the PCM may be encapsulated within the cells of the foam structure as illustrated in, for example, U.S. Pat. No. 4,003,426. Other useful encapsulating means are concrete, metal or plastic containers, pipes, and the like.

SUMMARY OF THE INVENTION

The invention relates to reversible liquid/solid phase change compositions. More particularly, the invention resides in phase change compositions comprising a mixture of hydrated calcium chloride and potassium chloride in which the KCl modifies the semi-congruently melting behavior of $CaCl_2.6H_2O$ to the extent that the mixture approaches, and nearly reaches, congruent melting behavior. In a preferred application the phase change composition also includes the addition of NaCl and/or $SrCl_2.6H_2O$ to further modify the $CaCl_2.6H_2O/KCl$ mixture to thereby obtain a composition which is effectively a congruently melting composition. Optionally, the compositions of the invention also contain select nucleating additives to modify and suppress the supercooling properties of the liquid phase of the phase change compositions.

The present invention now recognizes that the addition of a predetermined amount of KCl to hydrated $CaCl_2$ substantially reduces the formation of crystal forms other than $CaCl_2.6H_2O$ thereby providing a $CaCl_2/KCl$ mixture in which the precipitation of crystal forms other than $CaCl_2.6H_2O$ on repeated melting and crystallization is substantially reduced. In addition, the hydrated $CaCl_2/KCl$ composition of the invention still provides a substantial cost advantage over other PCM's.

Although the hydrated $CaCl_2/KCl$ mixture of the invention surprisingly reduces the formation of crystal forms other than the hexahydrate form, it was found that it still retained the inherent characteristics of the supercooling properties of $CaCl_2.6H_2O$. Accordingly, the present invention provides for the addition of select nucleating agents to the mixture thereby substantially improving the supercooling characteristics of the hydrated $CaCl_2/KCl$ system.

The avoidance of supercooling during the crystallization of hydrated $CaCl_2$, as by the addition of various nucleating agents, is known in the literature. Nucleating agents are substances upon which the phase change material crystal will grow with little or no supercooling. Accordingly, nucleating agents were not intended as additives to achieve congruently melting salt hydrates. Nucleators for hydrated $CaCl_2$ systems in particular are described in, for example, U.S.S.R. Inventorship Certificate No. 568,669, granted Mar. 3, 1975; Japanese Pat. No. 969,909, granted Aug. 31, 1979; and U.S. Pat. No. 4,189,394.

The present invention comprises a further improvement over the state of the art in that the nucleators of the invention are selective nucleators that will effectively reduce supercooling in the hydrated $CaCl_2/KCl$ system of the present invention.

Although the addition of less than about 8.0 weight percent KCl to $CaCl_2.6H_2O$ effectively reduces the tendency of the phase change composition to form, on freezing, the undesired phase $CaCl_2.4H_2O$, even this amount is not quite sufficient to prevent completely the formation of $CaCl_2.4H_2O$. Accordingly, in a preferred embodiment of the invention, the formation of $CaCl_2.4H_2O$ can be totally prevented from crystallizing if KCl is used in combination with NaCl and/or $SrCl_2.6H_2O$. As hereinafter demonstrated, the addition of $SrCl_2.6H_2O$ to $CaCl_2.6H_2O$ to the full limit of its solubility does not prevent crystallization of $CaCl_2.4H_2O$ during freezing. However, as hereinafter further demonstrated, the addition of KCl plus NaCl; KCl plus $SrCl_2.6H_2O$, or KCl plus NaCl and $SrCl_2.6H_2O$ modifies the phase equilibrium of $CaCl_2.6H_2O$ to fully supress the crystallization of $CaCl_2.4H_2O$.

DETAILED DESCRIPTION OF THE INVENTION

The present invention represents a significant improvement towards the elusive goal of developing an inexpensive reversible liquid/solid phase change composition based on hydrated $CaCl_2$ in admixture with KCl in which the KCl is present in the hydrated $CaCl_2$ in an amount effective to reduce, during retrieval of the stored heat on freezing of the composition, formation of hydrated $CaCl_2$ crystalline phases other than $CaCl_2.6H_2O$. The most basic composition of the invention comprises a mixture of from about 46 to about 52 weight percent $CaCl_2$ and from about 0.5 to about 8.0 weight percent KCl, with the balance being $H_2O$ (in an amount up to 100 weight percent). Preferably, the composition of the invention comprises a mixture of from about 47 to about 51 weight percent $CaCl_2$ and from about 2.3 to about 6.0 weight KCl with the balance being $H_2O$ (in an amount of up to 100 weight percent). Most preferably, the composition of the invention comprises a mixture of from about 48.0 to about 48.5 weight percent of $CaCl_2$ and from about 4.0 to about 4.7 weight percent KCl with the balance being $H_2O$ (in an amount of up to 100 weight percent).

Effective amounts of the selected nucleating agents for the hydrated $CaCl_2/KCl$ system of the invention are determined by testing a given composition over repetitive phase change cycles. While the following data illustrate that the nucleating agents produce marked benefits, such amounts should preferably not exceed 2.0 weight percent of the weight of the hydrated $CaCl_2/KCl$ mixture. Preferably, the nucleating agents are present in an amount of from about 0.005 to about 2.0 weight percent, based on the total weight of the composition. More preferably, the amount of the nucleating agents in the phase change composition is from about 0.01 to about 1.0 weight percent and most preferably, from about 0.10 to about 0.50 weight percent. It should be understood, however, that when reference is made to the addition of a given percentage of a nucleating agent, it is in addition to the amounts of ingredients already present in the phase change composition. Accordingly, the existing ingredient percentages are reduced proportionately to accomodate the addition of a nucleating agent(s).

Hydrated salt phase change materials exhibit three general types of phase/change behavior: congruent, semi-congruent and incongruent melting. The most desirable behavior is congruent melting which occurs when the solid phase change composition (ratio of salt to bound water) is the same as the liquid phase composition. In that case, the hydration/dehydration process appears identical to the melting and freezing process.

The term "effectively congruently melting mixture" herein used defines a mixture of ingredients, based on aqueous calcium chloride, for which, at the melting point, solid and liquid phases are in stable equilibrium: the solid phase containing no hydrated calcium chloride material other than the hexahydrate or solid solutions thereof; and the liquid phase containing, for every mole of calcium chloride, six moles of water, plus sufficient water to form the stable hydrate of any additive materials in solution.

Semi-congruent melting occurs when a phase change material has two or more hydrate forms with differing solid compositions and melting points. The material can be transformed into other hydrate forms before either complete melting or freezing occurs, resulting in a broadened melting point range. In addition, there is a temporary loss in thermal storage capacity. Calcium chloride hexahydrate is an example of a semi-congruently melting phase change material.

Incongruently melting phase change materials yield two distinct phases upon melting: a saturated solution and a precipitate of an insoluble anhydrous salt. If the precipitate settles out of the solution, the anhydrous salt will not hydrate completely upon cooling and some thermal storage capacity will be lost with each freezing-/melting cycle. Incongruent melting, as observed with sodium sulfate decahydrate, for example, is a more serious problem because it can result in a continual loss of latent heat storage capacity.

The term "supercooling" refers to a discrepancy between the temperature at which freezing initiates and the melting temperature of a given liquid/solid phase change material when cooled and heated under quiescent conditions.

The term "additives" includes, in addition to nucleating agents such as have been specified hereinbelow, precursors of such additives which are non-detrimental to the function of the phase change materials of the invention. More particularly, the additives herein referred to are either anhydrous or hydrated compositions of inorganic salts or precursor materials which would form the salt upon addition to hydrated calcium chloride.

Impurities may be present in the phase change composition in minor amounts of less than 3.0 weight percent and provided that such impurities do not detrimentally affect the function of the basic hydrated $CaCl_2/KCl$ phase change compositions of the invention which may include the hereinafter specified nucleating agents and additives such as NaCl and/or $SrCl_2.6H_2O$. Impurities may include, for example, alkaline earth or alkali metal halides such as $CaBr_2$; LiCl; $MgCl_2$, or other calcium salts such as $CaCO_3$ or $CaSO_4$.

Nucleating agents which have been found to be of particular benefit in the $CaCl_2/KCl$ mixture of the present invention are $Ba(OH)_2$, BaO, $BaI_2$, $BaS_2O_3$, $BaCO_3$, $BaCl_2$, $BaF_2$, $BaF_2.HF$, $Sr(OH)_2$, SrO, $SrCO_3$, $SrF_2$, $SrI_2$, or mixtures thereof. Nucleators selected from $BaCO_3$; $BaCl_2$; BaO; $Ba(OH)_2$; $BaI_2$; $BaSO_4$ $Sr(OH)_2$, SrO, or mixtures thereof are preferred.

Compositions containing $SrCl_2.6H_2O$ as an additive or self-nucleating, unless heated to a temperature sufficient to dehydrate the $SrCl_2.6H_2O$. Compositions not containing $SrCl_2.6H_2O$ as an additive should employ another nucleating additive, unless suitable mechanical means of nucleation are used.

The heat storage composition of the invention is preferably encapsulated in plastic containers such as the containers sold by Solar Inc., of Mead. Nebr. under the Trade Name SI Suntainer and described in *Solar Engineering* of April 1980, page 44. In accordance with the present invention, the reversible liquid-solid phase change composition is hermetically sealed in the encapsulating means to prevent evaporation of water from the composition. The composition comprises an admixture of hydrated $CaCl_2$ and $KCl$, wherein the $KCl$ is added in an amount of less than 8.0 weight percent such that the weight ratio of $KCl$ to $CaCl_2$ is from 1:50 to 1:5, the balance of the composition is $H_2O$ up to 100 weight percent. Preferably, the composition includes one or more nucleating agents in an amount of from about 0.005 to about 2.0 weight percent to reduce supercooling to 5° C. or less during retrieval of the stored heat by crystallization. The nucleating agents are selected from $Ba(OH)_2$, $BaO$, $BaI_2$, $BaSO_4$, $BaS_2O_3$, $BaCO_3$, $BaCl_2$, $BaF_2$, $BaF_2.HF$, $Sr(OH)_2$, $SrO$, $SrCO_3$, $SrF_2$, $SrI_2$, or mixtures thereof. The composition may also include impurities in an amount of less than 3.0 weight percent.

The following examples illustrate the effectiveness of $KCl$ for suppressing the formation of unwanted hydrates in the $CaCl_2.6H_2O/KCl$ phase change compositions of the invention.

EXAMPLE 1

883 Grams of a stirred liquid aqueous solution of 47.4 weight percent $CaCl_2$ was allowed to cool until a substantial quantity of $CaCl_2.6H_2O$ crystals was formed in the solution. 8.3 Grams of powdered $KCl$ was then added and allowed to dissolve. When equilibrium was established (at 27.85° C.), an aliquot of the liquid phase was analyzed and found to contain 47.05 weight percent $CaCl_2$ and 0.95 weight percent $KCl$. Stepwise additions of a liquid aqueous solution of 55 weight percent $CaCl_2$ and powdered $KCl$ were then made, allowing the system to come to equilibrium after each addition.

After 607.9 g of a 55 weight percent $CaCl_2$ solution and 4.4 powdered $KCl$ had been added, and equilibrium was established at 29.02° C., an aliquot of the liquid phase showed 49.32 weight percent $CaCl_2$ and 0.96 weight percent $KCl$. Optical Microscopy showed only hexagonal $CaCl_2.6H_2O$ in the suspended solid phase.

After an additional 101.8 g of a 55 weight percent aqueous $CaCl_2$ and 1.2 g powdered $KCl$ was added, the equilibrium temperature was 29.35° C., and the liquid phase contained 49.29 weight percent $CaCl_2$ and 0.95 weight percent $KCl$. Optical Microscopy showed only the triclinic crystals of $CaCl_2.4H_2O$ in the suspended solid phase.

Further additions of 55 weight percent aqueous $CaCl_2$ and powdered $KCl$ showed that for a composition with a weight ratio of $KCl:CaCl_2$ being 1:50, and a mole ratio of $H_2O:CaCl_2$ being 6:1, the equilibrium melting point of $CaCl_2.4H_2O$ is 32.1° C., and of $CaCl_2.6H_2O$ (extrapolated) is 29.2° C. Thus, a melted $CaCl_2.6H_2O$ sample with the above composition, if cooled, must cool through a temperature span of 2.9° C., during which crystallization of $CaCl_2.4H_2O$ is possible, before freezing of $CaCl_2.6H_2O$ can begin.

EXAMPLE 2

In the same manner as in Example 1, 932 g of 46.0 weight percent aqueous $CaCl_2$ and 20.69 g powdered $KCl$ were brought into equilibrium with solid $CaCl_2.6H_2O$ at 25.85° C. The liquid phase contained 45.28 weight percent $CaCl_2$ and 2.46 weight percent $KCl$.

Stepwise addition of 55 weight percent aqueous $CaCl_2$ and powdered $KCl$ resulted in a slurry of solid $CaCl_2.6H_2O$ in equilibrium at 28.13° C. with a solution containing 48.73 weight percent $CaCl_2$ and 2.64 weight percent $KCl$. The further addition of 55 weight percent $CaCl_2$ gave an equilibrium slurry (28.70° C.) of $CaCl_2.4H_2O$ in a solution with 48.98 weight percent $CaCl_2$ and 2.43 weight percent $KCl$.

Further additions of concentrated $CaCl_2$ solution and powdered $KCl$ showed that for a composition with a weight ratio of $KCl:CaCl_2$ being 1:20, and a mole ratio of $H_2O:CaCl_2$ being 6:1, the equilibrium melting point of $CaCl_2.4H_2O$ is 30.1° C., and of $CaCl_2.6H_2O$ (extrapolated) 28.1° C. A melted $CaCl_2.6H_2O$ sample of the above composition, in freezing, must cool, therefore, through a temperature span of 2.0° C., during which crystallization of $CaCl_2.4H_2O$ is possible, before freezing of $CaCl_2.6H_2O$ can begin.

EXAMPLE 3

In the same manner as in Examples 1 and 2, 889 g of 44.0 weight percent aqueous $CaCl_2$, saturated with $KCl$, was brought into equilibrium with solid $CaCl_2.6H_2O$ at 24.52° C. The liquid phase contained 44.16 weight percent $CaCl_2$ and 3.16 weight percent $KCl$.

Stepwise addition of an aqueous solution of 53.7 weight percent $CaCl_2$ *l and* 2.6 weight percent $KCl$, supplemented on occasion with powdered $KCl$, resulted in a slurry of solid $CaCl_2.6H_2O$ and $KCl$ in equilibrium at 27.26° C. with a solution containing 48.21 weight percent $CaCl_2$ and 4.19 weight percent $KCl$. Further addition of the 53.7/2.6 weight percent $CaCl_2/KCl$ solution and powdered $KCl$ yielded a slurry of solid $CaCl_2.4H_2O$ and $KCl$ in equilibrium at 27.91° C. with a solution analyzing at 48.21 weight precent $CaCl_2$ and 4.48 weight percent $KCl$.

Further additions of the concentrated $CaCl_2/KCl$ solution and solid $KCl$ showed that below a mole ratio of about 5.9:1, $H_2O:CaCl_2$, $KCl$ is completely soluble, if a weight ratio of $KCl:CaCl_2$ of 1:10 is maintained. At a 6:1 mole ratio of $H_2O:CaCl_2$ and a weight ratio of $KCl:CaCl_2$ of 1:10, the equilibrium melting point of $CaCl_2.4H_2O$ is 28.0° C., and of $CaCl_2.6H_2O$, 27.3° C. A liquefied sample of $CaCl_2.6H_2O$ of this composition, in freezing, must cool through a span of only 0.7° C., during which crystallization of $CaCl_2.4H_2O$ is possible, before freezing of $CaCl_2.6H_2O$ can occur.

EXAMPLE 4

In the same manner as in Examples 1, 2 and 3, a sample of aqueous $CaCl_2$ was studied, without the addition of any $KCl$. At a mole ratio of 6:1, $H_2O:CaCl_2$, with no $KCl$ present, the equilibrium melting point of $CaCl_2.4H_2O$ is 32.8° C., and of $CaCl_2.6H_2O$ is 29.6° C. Thus, a melted sample of $CaCl_2.6H_2O$, in cooling, must pass through a span of 3.2° C., during which $CaCl_2.4H_2O$ crystallization is possible, before $CaCl_2.6H_2O$ freezing can begin.

TABLE I

Effect of Potassium Chloride on Calcium Chloride Hydrate Phases[a]

| KCl/CaCl$_2$ wt. ratio | CaCl$_2$.4H$_2$O m.p., °C. | CaCl$_2$.6H$_2$O m.p., °C. | CaCl$_2$.4H$_2$O Stable Span | Max. Amt. CaCl$_2$.4H$_2$O |
|---|---|---|---|---|
| 0[b] | 32.8 | 29.6 | 3.2° C. | 9.45% |
| 1:50 | 32.1 | 29.2 | 2.9° C. | 7.58% |
| 1:20 | 30.1 | 28.1 | 2.0° C. | 5.88% |
| 1:10 | 28.0 | 27.3 | 0.7° C. | 1.86% |

[a]6:1 mole ratio H$_2$O:CaCl$_2$
[b]Not an example of the invention - Example 4
m.p. — melting point Table I summarizes the findings of Examples 1–4 as to the equilibrium melting points of the tetrahydrate and hexahydrate of CaCl$_2$.

Table I also shows the maximum theoretical amount of CaCl$_2$.4H$_2$O that could be formed in the freezing process. This was calculated using the "lever principle", from the peritectic compositions determined in the experiments outlined in Examples 1 to 4. It was surprisingly found that the addition of KCl not only reduces the temperature span within which CaCl$_2$.4H$_2$O can be formed, but that it also reduces the maximum theoretical conversion of the CaCl$_2$.4H$_2$O crystal form.

In practice, less than the theoretical amount of CaCl$_2$.4H$_2$O is obtained. Both supercooling and slow crystal growth rate mitigate against tetrahydrate formation. For example, a composition of Example 3 containing 48.22 weight percent CaCl$_2$, 4.82 weight percent KCl, and 49.96 weight percent H$_2$O would yield no CaCl$_2$.4H$_2$O whatsoever, if the tetrahydrate supercooled as little as 0.7° C. and the hexahydrate were nucleated so as not to supercool. Further, in the experiments described in Examples 1, 2 and 3 above, it was noted that whenever CaCl$_2$.4H$_2$O crystals were present, upon each addition of concentrated CaCl$_2$ solution, a much greater time period was required for temperature/composition equilibrium to be established than was the case in Example 4 which did not contain KCl. This illustrates the slow rate of CaCl$_2$.4H$_2$O formation.

EXAMPLE 5

In order to determine the effects of nucleating agents on hydrated CaCl$_2$/KCl heat storage materials, a number of 80 gram samples of CaCl$_2$.6H$_2$O were prepared with varying levels of KCl added to the CaCl$_2$.6H$_2$O. Selected nucleating agents were added to the hydrated CaCl$_2$/KCl mixture to study their effects on supercooling.

For comparison, a control sample was prepared without the addition of a nucleating agent to the hydrated CaCl$_2$/KCl storage material. The control sample contained 48.2 weight percent CaCl$_2$; 4.8 weight percent KCl and 47.0 weight percent water. In 4 of 10 freeze-thaw cycles, the control sample completely failed to freeze. In the remaining 6 cycles, an average supercooling temperature of greater than 14° C. was detected.

The results of the effect of KCl on barium salt nucleators for CaCl$_2$.6H$_2$O are summarized in Table II.

TABLE II

| Nucleator Compound | Wt. % | Supercooling, °C., Average No KCl[a] | KCl:CaCl$_2$ 1:20 | KCl:CaCl$_2$ 1:10 |
|---|---|---|---|---|
| None[a] | — | — | — | >14 |
| Ba(OH)$_2$ | 2.00 | — | — | 2.5 |
| " | 1.00 | — | 0.3 | 4.9 |
| " | 0.50 | 0.0 | 0.25 | 9.5 |
| " | 0.10 | 0.16 | — | — |
| " | 0.05 | 0.55 | — | — |
| " | 0.01 | 1.92 | — | — |
| " | 0.005 | 4.45 | 7.5 | — |
| BaO | 1.00 | — | 0.7 | >11 |
| " | 0.05 | — | 2.25 | 12.4 |
| " | 0.10 | 0.40 | — | — |
| " | 0.05 | 1.45 | — | — |
| " | 0.01 | 12.0 | — | — |
| BaI$_2$ | 1.00 | — | 1.6 | >15 |
| " | 0.50 | — | 3.9 | 13.3 |
| " | 0.10 | 0 | — | — |
| " | 0.05 | 0.4 | — | — |
| " | 0.01 | 4.7 | — | — |
| BaSO$_4$ | 1.00 | — | 7.7 | >16 |
| " | 0.50 | — | 8.0 | 17.7 |
| " | 0.10 | 0.26 | — | — |
| " | 0.05 | 7.4 | — | — |
| BaCO$_3$ | 1.00 | — | 2.3 | >14 |
| " | 0.50 | — | 4.9 | 11.9 |
| " | 0.10 | 0 | — | — |
| " | 0.05 | 0 | — | — |
| " | 0.01 | 0.1 | — | — |
| " | 0.005 | 6.0 | — | — |
| BaCl$_2$ | 1.00 | — | 1.0 | >15 |
| " | 0.50 | 0 | 11.0 | 12.3 |
| " | 0.10 | 1.03 | — | — |
| " | 0.01 | 1.38 | — | — |

[a]Not an example of the invention.

From Table II, it is evident that, in the absence of KCl, the amount of supercooling decreased as the level of the barium salt nucleator was increased. At a level of 0.5 weight percent, no supercooling was observed. In the case of BaCO$_3$ substantially no supercooling was observed at a level as low as 0.01 weight percent. For example containing KCl, the effectiveness of the nucleators diminished and a higher level of supercooling was observed as the KCl level was raised. Accordingly, it is evident from the data that higher levels of nucleators must be added in the presence of KCl to control supercooling. In general, depending on the barium salt selected as the nucleator, it is desirable to add at least 0.5 weight percent when the ratio of KCl:CaCl$_2$ is 1:20. When the ratio of KCl:CaCl$_2$ reached 1:10, it was found that the addition of a nucleator at that level produced no further benefits in reducing the level of supercooling. It would therefor be impractical to rely solely on any one of a select barium salt or barium salt mixture to control supercooling at a KCl:CaCl$_2$ ratio of 1:10 or greater.

The effects of strontium salt nucleators on the hydrated CaCl$_2$/KCl composition of the invention are illustrated in Table III.

TABLE III

Effect of KCl on Strontium Salt Nucleators for $CaCl_2.6H_2O$

| Nucleator | | Supercooling, °C., Average | | |
|---|---|---|---|---|
| Compound | Wt. % | No KCl | KCl:CaCl$_2$ 1:20 | KCl:CaCl$_2$ 1:10 |
| None | — | — | — | >14 |
| SrCl$_2$ | 2.00 | — | — | 0.1 |
| " | 1.00 | 0 | — | — |
| " | 0.50 | 6.3 | — | — |
| " | 0.10 | >15 | — | — |
| Sr(OH)$_2$ | 0.50 | 0 | 0 | 0 |
| " | 0.10 | 0.95 | — | — |
| " | 0.05 | — | — | — |
| " | 0.02 | 15.85 | 5.55 | — |

Table III illustrates that at the 2.0 weight percent level of SrCl$_2$, the amount of supercooling can be reduced nearly to zero, even in the presence of the maximum level of KCl. In the case of Sr(OH)$_2$, the addition of 0.5 weight percent surprisingly eliminated supercooling completely, even at the highest ratio of KCl:CaCl$_2$ of 1:10.

Table IV shows the combined effect of barium salts and strontium salts on supercooling of hydrated CaCl$_2$ and KCl heat storage compound.

TABLE IV

Combined Effect of Binary Nucleators on $CaCl_2.6H_2O$

| Nucleator | | Supercooling Average, °C. | | | |
|---|---|---|---|---|---|
| | | No KCl$^{(a)}$ | KCl:CaCl$_2$:SrCl$_2$ | | |
| Compound | Wt. % | No SrCl$_2$ | 5:100:2$^{(c)}$ | 5:100:1 | 10:100:1 |
| Ba(OH)$_2$ | 1.00 | — | — | — | 0 |
| " | 0.50 | 0 | 0 | 0 | 4.2 |
| " | 0.10 | 0.18 | 0.30 | — | — |
| " | 0.05 | 0.69 | 0.78 | — | — |
| " | 0.01 | 1.92 | 1.72 | — | — |
| BaO | 0.50 | 0 | — | 0 | 3.8 |
| " | 0.10 | 0.32 | 0.58 | — | — |
| BaCO$_3$ | 0.50 | $(b)$ | — | 0 | 3.3 |
| BaSO$_4$ | 0.50 | $(b)$ | — | 1.1 | 6.3 |
| BaCl$_2$ | 0.50 | 0 | 0 | 0.2 | 0.4 |
| " | 0.10 | 0.40 | 0.98 | — | — |
| " | 0.01 | — | 1.38 | — | — |
| BaI$_2$ | 0.50 | $(b)$ | — | 0 | 7.0 |
| None | — | 11.9 | 7.7 | — | — |

$^{(a)}$Not an example of the invention
$^{(b)}$Assumed to be 0, since the lower level of nucleator yielded 0° supercooling
$^{(c)}$NaCl:CaCl$_2$ (1:100).

From Table IV, it will be noted that the presence of the binary barium/strontium salt nucleator had the unexpected property of suppressing supercooling even in the presence of a high level of KCl. Very little difference was observed between the results for nucleated pure CaCl$_2$.6H$_2$O and nucleated CaCl$_2$.6H$_2$O containing KCl and SrCl$_2$. Since KCl is known to reduce the effectiveness of barium salts, the lack of supercooling can be attributed to the action of SrCl$_2$ in reversing the effect of KCl on nucleators.

Table V illustrates the most effective combination of barium salt or strontium salt nucleators, or mixtures thereof, and weight percentages on supercooling of KCl/CaCl$_2$ mixtures at ratios of 1:20 and 1:10.

TABLE V

| Nucleator(s) | | Supercooling, °C., Average | |
|---|---|---|---|
| Compound | Weight Percent | KCl:CaCl$_2$ = 1:20 | KCl:CaCl$_2$ = 1:10 |
| Ba(OH)$_2$ | 0.5 | 0.25 | |
| BaO | 1.0 | 0.7 | |
| BaO | 0.5 | 0.0 | |
| SrCl$_2$ | 0.5 | | |
| BaI$_2$ | 1.0 | 1.6 | |
| BaI$_2$ | 0.5 | 0.0 | |
| SrCl$_2$ | 0.5 | | |
| BaSO$_4$ | 0.5 | 1.1 | |
| SrCl$_2$ | | | |
| BaCO$_3$ | 0.5 | 0.0 | |
| SrCl$_2$ | 0.5 | | |
| BaCl$_2$ | 1.0 | 1.0 | |
| BaCl$_2$ | 0.5 | 0.2 | 0.4 |
| SrCl$_2$ | 0.5 | | |
| Sr(OH)$_2$ | 0.5 | | 0.0 |

From Table V, it will be seen that the addition of BaI$_2$ suppresses supercooling to 1.6° C. and although higher than the remaining listed nucleators, still represents a highly effective material. Surprisinly, the mixture of BaI$_2$ with SrCl$_2$ suggests a synergistic effect since 0° C. supercooling was obtained.

EXAMPLE 6

The following Example involves saturation of CaCl$_2$.6H$_2$O with NaCl. It shows that there is but a slight effect on the potential formation of tetrahydrate from this additive alone.

In the same procedural manner as in Example 2, 1230 g of a 47.47 weight percent aqueous CaCl$_2$ solution and 12.4 g NaCl powder were mixed and brought to equilibrium with solid CaCl$_2$.6H$_2$O at 28.13° C. The liquid phase contained 47.28 weight percent CaCl$_2$, 52.43 weight percent H$_2$O, and 0.29 weight percent NaCl by analysis.

Stepwise addition of an aqueous solution of 55.15 weight percent CaCl$_2$ resulted in a slurry of solid CaCl$_2$.6H$_2$O and NaCl in metastable equilibrium at 29.40° C. with a solution of 49.92 weight percent CaCl$_2$, 49.84 weight percent H$_2$O, and 0.24 weight percent NaCl, by analysis. Further addition of the 55.15 weight percent solution of CaCl$_2$ yielded a slurry of solid CaCl$_2$.4H$_2$O and NaCl in equilibrium at 31.48° C. with a solution of 50.14 weight percent CaCl$_2$, 49.60 weight percent H$_2$O, and 0.26 weight percent NaCl.

Further additions of the concentrated CaCl$_2$ solution showed that at a 6:1 mole ratio of H$_2$O:CaCl$_2$, saturated with NaCl, the equilibrium melting point of CaCl$_2$.4H$_2$O is 32.8° C., and the metastable equilibrium melting point of CaCl$_2$.6H$_2$O is 29.4° C. A liquefied sample of CaCl$_2$.6H$_2$O of this composition, in freezing, must cool through a span of 3.4° C., during which the crystallization of CaCl$_2$.4H$_2$O is possible, before freezing of CaCl$_2$.6H$_2$O can begin. Thus, saturation with NaCl causes a slight increase in the tendency to form tetrahydrate.

EXAMPLE 7

This Example involves saturation of CaCl$_2$.4H$_2$O with both KCl and NaCl, and it is an example of the present invention. It shows that although NaCl addition causes a slight increase in CaCl$_2$.4H$_2$O formation, and KCl addition markedly reduces, but does not eliminate CaCl$_2$.4H$_2$O formation, the combination of KCl and NaCl additives totally suppresses tetrahydrate formation.

In the same procedural manner as in Example 2, 898 g of a mixture of 46 weight percent CaCl$_2$, 47 weight percent H$_2$O, 6 weight percent KCl, and 1 weight percent NaCl was heated, cooled, and brought to equilibrium at 26.02° C. $CaCl_2.6H_2O$, KCl, and NaCl crystals were in equilibrium with a solution of 45.65 weight percent $CaCl_2$, 49.5 weight percent $H_2O$, 3.9 weight percent KCl, and 9.95 weight percent NaCl.

Stepwise addition of an aqueous solution of 53.0 weight percent $CaCl_2$, 5.5 weight prcent KCl, and 41.5 weight percent $H_2O$ resulted in a slurry of $CaCl_2.6H_2O$ in equilibrium at 26.90° C. with a solution containing 47.90 weight percent $CaCl_2$, 46.6 weight percent $H_2O$, 4.7 weight percent KCl, and 0.83 weight percent NaCl. Further addition of the 53.0/5.5 weight percent $CaCl_2$/KCl solution and 5 g powdered NaCl yielded a slurry of $CaCl_2.4H_2O$ in equilibrium at 27.82° C. with a solution analyzing 48.15 weight percent $CaCl_2$, 46.2 weight percent $H_2O$, 4.8 weight percent KCl, and 0.86 weight percent NaCl.

Further addition of the concentrated $CaCl_2$/KCl solution, powdered NaCl, and powdered KCl demonstrated that at a 6:1 mole ratio of $H_2O:CaCl_2$, saturated with KCl and NaCl, the equilibrium melting point of $CaCl_2.6H_2O$ is 27.0° C., and the metastable equilibrium melting point of $CaCl_2.4H_2O$ is about 26.7° C. A liquefied sample of $CaCl_2.6H_2O$ of this composition, in freezing, will crystallize to solid $CaCl_2.6H_2O$, without the possibility of $CaCl_2.4H_2O$ formation.

EXAMPLE 8

This Example is not an example of the invention and demonstrates that $CaCl_2.6H_2O$ saturated with $SrCl_2.6H_2O$ decreases but cannot eliminate the potential for tetrahydrate formation.

In the same procedural manner as in Example 2, 748 g of a mixture of 45 weight percent $CaCl_2$, 53 weight percent $H_2O$, and 2 weight percent $SrCl_2$ was heated, cooled, and brought to equilibrium at 25.91° C. Crystals of $SrCl_2.2H_2O$ and $CaCl_2.6H_2O/SrCl_2.6H_2O$ solid solution were in equilibrium with liquid analyzing 44.18 weight percent $CaCl_2$, 55.37 weight percent $H_2O$, and 0.55 weight percent $SrCl_2$.

Stepwise addition of a solution of 54.3 weight percent $CaCl_2$, 43.7 weight percent $H_2O$, and 2.0 weight percent $SrCl_2$ resulted in a slurry of $CaCl_2.6H_2O/SrCl_2.6H_2O$ solid solution and $SrCl_2.2H_2O$ crystals in metastable equilibrium at 30.28° C. with liquid analyzing 50.08 weight percent $CaCl_2$, 49.22 weight percent $H_2O$, and 0.70 weight percent $SrCl_2$.

Further stepwise addition of concentrated $CaCl_2/SrCl_2$ solution, followed by cooling, resulted in a slurry of $CaCl_2.4H_2O$ and $SrCl_2.2H_2O$ in equilibrium at 30.50° C. with liquid analyzing 49.70 weight percent $CaCl_2$, 49.66 weight percent $H_2O$, and 0.50 weight percent $SrCl_2$.

Further experiments of this type showed that at a mole ratio of 6:1 of $H_2O:(CaCl_2+SrCl_2)$, the equilibrium melting point of $CaCl_2.4H_2O$ is 32.1° C., and the metastable equilibrium melting point of a $CaCl_2.6H_2O$ (solid solution) is 30.4° C. A liquefied sample of $CaCl_2.6H_2O$ of this composition, in freezing must cool through a span of 1.7° C., during which $CaCl_2.4H_2O$ can freeze, before crystallization of $CaCl_2.6H_2O$ can begin. Thus, $SrCl_2.6H_2O$ additive reduces the tendency of the tetrahydrate to form (roughly by half), but does not prevent it entirely.

EXAMPLE 9

The following example involves the saturation of $CaCl_2.6H_2O$ with both KCl and $SrCl_2.6H_2O$, and is an example of the present invention. This Example demonstrates that the addition of both KCl and $SrCl_2.6H_2O$ to $CaCl_2.6H_2O$ totally reduces tetrahydrate formation.

In the same procedural manner as in Example 2, 757 g of a mixture of 43.4 weight percent $CaCl_2$, 4.3 weight percent KCl, 1.9 weight percent $SrCl_2$, and 50.3 weight percent $H_2O$ was heated, cooled, and brought to equilibrium at 27.18° C. Crystals of KCl, $SrCl_2.2H_2O$ and $CaCl_2.6H_2O/SrCl_2.6H_2O$ were in equilibrium in a liquid which was analyzed to contain 44.21 weight percent $CaCl_2$, 3.9 weght percent KCl, 1.15 weight percent $SrCl_2$, and 50.7 weight percent $H_2O$.

Stepwise addition of a solution containing 51.7 weight percent $CaCl_2$, 5.2 weight percent KCl, 1.0 weight percent $SrCl_2$ and 42.2 weight percent $H_2O$ led to a slurry of $CaCl_2.6H_2O/SrCl_2.6H_2O$ solid solution, $SrCl_2.2H_2O$ and KCl crystals in equilibrium at 27.68° C. The liquid was analyzed to contain 47.57 weight percent $CaCl_2$, 47.02 weight percent $H_2O$, 4.65 weight percent KCl, and 0.76 weight percent $SrCl_2$.

Further stepwise additions of concentrated $CaCl_2/KCl/SrCl_2$ solution, followed by cooling, led to a slurry of $CaCl_2.4H_2O$, $SrCl_2.2H_2O$, and KCl in equilibrium at 27.54° C. The liquid was analyzed to contain 48.03 weight percent $CaCl_2$, 46.45 weight percent $H_2O$, 4.9 weight percent KCl, and 0.62 weight percent $SrCl_2$.

Further experiments of this type showed that at a mole ratio of 6:1 of $H_2O:(CaCl_2+SrCl_2)$, the equilibrium melting point of $CaCl_2.6H_2O$ (solid solution) is 27.8° C., and the metastable equilibrium melting point of $CaCl_2.4H_2O$ is about 27° C. A liquefied sample of $CaCl_2.6H_2O$ of this composition, in freezing, will crystallize to crystalline $CaCl_2.6H_2O/SrCl_2.6H_2O$ solid solution without the possibility of tetrahydrate formation.

EXAMPLE 10

This Example illustrates saturation of $CaCl_2.6H_2O$ with KCl, $SrCl_2.6H_2O$, and NaCl, and is an example of the present invention. Since tetrahydrate crystallization in $CaCl_2.6H_2O$ can be suppressed by adding $KCl+SrCl_2$ or $KCl+NaCl$, but not $SrCl_2+NaCl$, this Example surprisingly demonstrates that addition of all three salts would be beneficial in completely suppressing the tetrahydrate formation.

In the same procedural manner as in Example 2, 761 g of a mixture of 43.16 weight percent $CaCl_2$, 49.52 weight percent $H_2O$, 4.37 weight percent KCl, 1.96 weight percent $SrCl_2$, and 0.99 weight percent NaCl was heated, cooled, and brought to equilibrium at 26.62° C. Crystals of $CaCl_2.6H_2O/SrCl_2.6H_2O$, $SrCl_2.2H_2O$, KCl, and NaCl were in equilibrium. The liquid was analyzed to contain 43.98 weight percent $CaCl_2$, 50.78 weight percent $H_2O$, 3.90 weight percent KCl, 1.02 weight percent $SrCl_2$, and 0.32 weight percent NaCl.

Stepwise addition of a solution containing 51.8 weight percent $CaCl_2$, 41.5 weight percent $H_2O$, 5.2 weight percent KCl, 1.0 weight percent $SrCl_2$, and 0.5 weight percent NaCl led to a slurry of $CaCl_2.6H_2O/SrCl_2.6H_2O$, $SrCl_2.2H_2O$, KCl, and NaCl in equilibrium at 27.56° C. The liquid was analyzed to contain 47.52 weight percent $CaCl_2$, 46.62 weight percent $H_2O$, 4.75 weight percent KCl, 0.83 weight percent $SrCl_2$, and 0.28 weight percent NaCl.

Further stepwise addition of the concentrated $CaCl_2/KCl/SrCl_2/NaCl$ solution led to a slurry of $CaCl_2.4H_2O$, $SrCl_2.2H_2O$, KCl, and NaCl in equilibrium. The liquid was analyzed to contain 48.48 weight percent $CaCl_2$, 45.68 weight percent $H_2O$, 5.33 weight percent KCl, 0.84 weight percent $SrCl_2$, and 0.26 weight percent NaCl, at a temperature of 27.77° C.

At a mole ratio of 6:1 of $H_2O:(CaCl_2+SrCl_2)$, the equilibrium melting point of $CaCl_2.6H_2O$ (solid solution) is 27.5° C., and the metastable equilibrium melting point of $CaCl_2.4H_2O$ is about 26° C. A liquefied sample of $CaCl_2.6H_2O$ of this composition, in freezing, will crystallize to solid $CaCl_2.6H_2O/SrCl_2.6H_2O$ solid solution without the possibility of tetrahydrate formation.

Table VI summarizes the results of previous Examples 3 and 4 and new Examples 6 through 10 and the effects of additives on calcium hydrate phase at a 6:1 mole ratio, $H_2O:(CaCl_2+SrCl_2)$, saturated with the indicated additive(s).

TABLE VI

Effect of Additives on Calcium Chloride Hydrate Phases

| Additive | $CaCl_2.4H_2O$ m.p., °C. | $CaCl_2.6H_2O$ m.p., °C. | $CaCl_2.4H_2O$ Stable Span |
|---|---|---|---|
| 4 none | 32.8 | 29.6 | 3.2° C. |
| 3 KCl | 28.0 | 27.3 | 0.7° C. |
| 6 NaCl | 32.8 | 29.4 | 3.4° C. |
| 7 KCl + NaCl | 26.7 | 27.0 | none |
| 8 $SrCl_2$ | 32.1 | 30.4 | 1.7° C. |
| 9 KCl + $SrCl_2$ | 27 | 27.8 | none |
| 10 KCl + $SrCl_2$ + NaCl | 26 | 27.5 | none |

EXAMPLE 11

As a further demonstration of the elimination of $CaCl_2.4H_2O$ formation by the present invention, and as a comparison with other means of tetrahydrate supression, a number of $CaCl_2.6H_2O$ compositions with additives were prepared. These samples were melted, and cooled to a temperature barely above the melting point of $CaCl_2.6H_2O$, as determined by the experiments in the preceding Examples. After a period of equilibration, a seed crystal of $CaCl_2.4H_2O$ was added, and its effect observed. If formation of tetrahydrate were possible for these compositions, the seed crystal would persist or grow. Otherwise, it would dissolve. The results of these experiments are illustrated in Table VII in which the $CaCl_2.4H_2O$ seeding was conducted at a 6:1 mole ratio of $H_2O:(CaCl_2+SrCl_2)$, saturated with the indicated additive(s). These results confirm the present invention.

TABLE VII

| Additive | Temp. °C. | Result of Seeding |
|---|---|---|
| KCl | 27.5 | $CaCl_2.4H_2O$ growth |
| $SrCl_2$ | 31.0 | $CaCl_2.4H_2O$ growth |
| KCl + $SrCl_2$[a] | 27.8 | Seed dissolved |
| KCl + NaCl[a] | 26.9 | Seed dissolved |

[a]Examples of the present invention.

EXAMPLE 12

The experiment of Example 11 was repeated, using a sample prepared by following the procedures of Swedish Pat. No. 410,004.

148 Grams of $CaCl_2.6H_2O$ was prepared, containing 50.66 weight percent $CaCl_2$ and 49.43 weight percent $H_2O$. Then 2.97 g (2 percent by weight) $SrCl_2.6H_2O$ was added and dissolved at 60° C. After equilibration at 32° C. for 23 hours, the solution was filtered, and the test of Example 11 was performed at 30.6° C. Seeds of $CaCl_2.4H_2O$ grew in the solution. After two days the remaining liquid was found to contain 49.30 percent $CaCl_2$, 50.31 percent $H_2O$, and 0.39 percent $SrCl_2$ by weight, a mole ratio of 6.252:1 of $H_2O:(CaCl_2+SrCl_2)$.

This experiment demonstrates that the composition is not a congruently melting composition.

SUMMARY OF EXAMPLES 6 TO 12

As discussed hereinbefore, the addition of $SrCl_2.6H_2O$ to the full limit of its solubility in $CaCl_2.6H_2O$ does not prevent the the crystallization of $CaCl_2.4H_2O$ during freezing of such composition. When $SrCl_2.6H_2O$ is added, the melting point of $CaCl_2.6H_2O$ increases (due to formation of an isomorphous solid solution), and the melting point of $CaCl_2.4H_2O$ decreases. Again, the freezing process is like that for pure $CaCl_2.6H_2O$, except that less tetrahydrate can form, and that solid solution freezes in place of the hexahydrate. At the solubility limit of about 1.0 weight percent $SrCl_2.6H_2O$, freezing of the tetrahydrate begins at 32.2° C., and the peritectic reaction isotherm is at 30.6° C. It is estimated that if about 2.1 weight percent $SrCl_2.6H_2O$ were dissolved, no tetrahydrate could form. However, the limit of solubility is about 1.0 weight percent. Accordingly, the effect of $SrCl_2.6H_2O$ on the freezing of $CaCl_2.6H_2O$ is as predicted by Carlsson, et al. but because of the solubility limit of $SrCl_2.6H_2O$ their predicted results cannot be achieved.

In accordance with the present invention, it has surprisingly been found that about 0.8 weight percent NaCl can be added to $CaCl_2.6H_2O$ saturated with KCl. This reduces the melting point of $CaCl_2.6H_2O$, but reduces faster the melting point of $CaCl_2.4H_2O$. The combined effect of the two additives is to prevent any tetrahydrate formation. The mixture melts at 27.0° C. The $CaCl_2.6H_2O/CaCl_2.4H_2O$ eutectic point is at 27.0° C. at the $CaCl_2.5.98H_2O$ stoichiometry.

In accordance with the invention, it has also been surprisingly found that when KCl is added to $CaCl_2.6H_2O$ saturated with $SrCl_2.6H_2O$, the melting point decreases. That of the tetrahydrate is affected more than that of the hexahydrate. The following data indicate that about 3.25 weight percent KCl will effectively prevent tetrahydrate formation. The solubility limit is about 4.75 weight percent, so that there is no problem in obtaining the necessary concentration. The mixture, saturated with KCl and $SrCl_2.6H_2O$, melts at 27.8° C. The hexahydrate/tetrahydrate eutectic point is at 27.6° C. and $CaCl_2.5.91H_2O$ stoichiometry.

Further, in accordance with the invention, it has been found that about 4.8 weight percent KCl, plus 0.3 weight percent NaCl, plus 0.8 weight percent $SrCl_2.6H_2O$ are soluble in $CaCl_2.6H_2O$ and that tetrahydrate crystallization is completely prevented. The mixture melts at 27.5° C. There is a eutectic point at 27.4° C. at the stoichiometry $(CaCl_2+SrCl_2).5.82H_2O$.

In Example 4, it was demonstrated that for $CaCl_2.6H_2O$ without additives, considerable tetrahydrate formation is possible during freezing.

In Example 3, it was demonstrated that by saturating $CaCl_2.6H_2O$ with KCl, the potential for tetrahydrate formation is reduced markedly and that KCl surprisingly modified the semi-congruently melting behavior of $CaCl_2.6H_2O$ to the extent that the mixture nearly reaches congruent melting behavior.

What is claimed is:

1. A reversible liquid/solid phase change composition comprising an admixture of hydrated $CaCl_2$ and KCl, wherein KCl is added to the hydrated $CaCl_2$ in an amount sufficient to modify the semi-congruent melting behavior of $CaCl_2.6H_2O$ to the extent that the mixture approaches the congruent melting behavior of a congruently melting mixture and to reduce, during retrieval of the stored heat by crystallization of the mixture, the formation of crystalline $CaCl_2$ hydrate phases other than $CaCl_2.6H_2O$.

2. The composition of claim 1, comprising from about 46 to about 52 weight percent $CaCl_2$ having KCl added to the $CaCl_2$ such that the KCl is present in an amount of from about 0.5 to about 8 weight percent, with the balance being $H_2O$ (up to 100 weight percent).

3. The composition of claim 1 or 2, comprising from about 48.0 to about 48.5 weight percent $CaCl_2$, having KCl added to the $CaCl_2$ such that the KCl is present in an amount of from about 4.0 to about 4.7 weight percent with the balance being $H_2O$ (up to 100 weight percent).

4. The composition of claim 1, wherein the weight ratio of KCl to $CaCl_2$ in the composition is from 1:50 to 1:5 and wherein the mole ratio of the $H_2O$ to $CaCl_2$ in the composition is about 6:1.

5. The composition of claim 4, wherein the weight ratio of KCl to $CaCl_2$ in the composition is from 1:15 to 1:10.

6. The composition of claim 1, including an amount of NaCl added to the hydrated $CaCl_2$ sufficient to obtain an effectively congruently melting mixture.

7. The composition of claim 6, wherein the weight ratio of NaCl to $CaCl_2$ in the composition is from 1:40 to 1:70.

8. The composition of claim 7, wherein the weight ratio of NaCl to $CaCl_2$ in the composition is from 1:45 to 1:65.

9. The composition of claim 1 or 6, including an amount of $SrCl_2.6H_2O$ added to the hydrated $CaCl_2$ sufficient to obtain an effectively congruently melting mixture.

10. The composition of claim 9, wherein the mole ratio of $H_2O$ to $CaCl_2$ plus $SrCl_2$ in the composition is about 6:1.

11. The composition of claim 9, wherein the weight ratio of $SrCl_2.6H_2O$ to $CaCl_2$ in the composition is from 1:50 to 1:110.

12. The composition of claim 11, wherein the weight ratio of $SrCl_2.6H_2O$ to $CaCl_2$ in the composition is from 1:75 to 1:100.

13. The composition of claim 9, wherein the weight ratio of $SrCl_2.6H_2O$ plus NaCl to $CaCl_2$ in the composition is from 1:40 to 1:70.

14. The composition of claim 1, including the addition of one or more nucleating agents in said composition in an amount of from about 0.005 to about 2.0 weight percent to reduce supercooling to 5° C. or less during retrieval of the stored heat by crystallization.

15. The composition of claim 14, wherein the nucleating agent is present in an amount of from about 0.10 to about 1.0 weight percent.

16. The composition of claim 14 or 15, wherein the nucleating agent is selected from $Ba(OH)_2$, BaO, $BaI_2$, $BaSO_4$, $BaS_2O_3$, $BaCO_3$, $BaCl_2$, $BaF_2$, $BaF_2.HF$, $Sr(OH)_2$, SrO, $SrCO_3$, $SrF_2$, $SrI_2$, or mixtures thereof.

17. The composition of claim 16, wherein the nucleating agent is selected from $Ba(OH)_2$; BaO; $BaI_2$; $BaSO_4$; $BaCO_3$; $BaCl_2$; $Sr(OH)_2$; or mixtures thereof.

18. The composition of claim 1, wherein said composition includes impurities in an amount of less thaan 3.0 weight percent.

19. In a reversible liquid/solid phase change composition comprising a mixture of $CaCl_2.6H_2O$/KCl/NaCl/$SrCl_2.6H_2O$ and impurities in an amount of less than 3 weight percent of the total weight of the composition, the improvement comprising the addition of KCl and NaCl in amounts sufficient to obtain an effectively congruently melting mixture.

20. The composition of claim 19, the improvement comprising from about 46 to about 52 weight percent $CaCl_2$, having KCl added to the $CaCl_2$ such that the KCl is present in an amount of from about 0.5 to about 8 weight percent with the balance being $H_2O$ (up to 100 weight percent).

21. The composition of claim 19, the improvement comprising a weight ratio of KCl and $CaCl_2$ in the composition of from 1:50 to 1:5, a weight ratio of NaCl to $CaCl_2$ in the composition of from 1:40 to 1:70, and a mole ratio of $H_2O$ to $CaCl_2$ in the composition of about 6:1.

22. The composition of claim 19, the improvement comprising the addition of $SrCl_2.6H_2O$ to the composition in an amount sufficient to obtain a weight ratio of $SrCl_2.6H_2O$ to $CaCl_2$ of from 1:50 to 1:110.

23. The composition of claim 19, the improvement comprising the addition of $SrCl_2.6H_2O$ plus NaCl to $CaCl_2$ in an amount sufficient to obtain a weight ratio of from 1:40 to 1:70.

24. The composition of claim 19, the improvement comprising the addition of one or more nucleating agents to said composition in an amount of from about 0.005 to about 2.0 weight percent to reduce supercooling to 5° C. or less during retrieval of the stored heat by crystallization.

25. The composition of claim 24, the improvement comprising a nucleating agent selected from $Ba(OH)_2$, BaO, $BaI_2$, $BaSO_4$, $BaS_2O_3$, $BaCO_3$, $BaCl_2$, $BaF_2$, $BaF_2.HF$, $Sr(OH)_2$, SrO, $SrCO_3$, $SrF_2$, $SrI_2$, or mixtures thereof.

26. The composition of claim 19, comprising the improvement of adding a sufficient amount of KCl to $CaCl_2$ to obtain a mixture of from about 48.0 to about 48.5 weight percent $CaCl_2$ and from about 4.0 to about 4.7 weight percent KCl, and water in an amount to obtain a mole ratio of $H_2O$ to $CaCl_2$ of about 6:1.

27. The composition of claim 19, comprising the improvement of adding $SrCl_2.6H_2O$ in an amount such that the weight ratio of $SrCl_2.6H_2O$ plus NaCl to $CaCl_2$ in the composition is from 1:40 to 1:70 and adding one or more nucleating agents in said composition in an amount of from about 0.005 to about 2.0 weight percent to reduce supercooling to 5° C. or less during retrieval of the stored heat by crystallization, said nucleating agents being selected from $Ba(OH)_2$; BaO; $BaI_2$; $BaSO_4$; $BaCO_3$; $BaCl_2$; $Sr(OH)_2$; or mixtures thereof.

28. A heat storage device comprising an encapsulating means having a reversible liquid-solid phase change composition hermetically sealed in said encapsulating means to prevent evaporation of water from the composition, said composition comprising an admixture of hydrated $CaCl_2$ and KCl, wherein KCl is added to the hydrated $CaCl_2$ in an amount of less than 8.0 weight percent such that the weight ratio of KCl to $CaCl_2$ is from 1:50 to 1:5, the balance of said composition being $H_2O$ up to 100 weight percent.

29. The heat storage device of claim 28, including an amount of NaCl added to the hydrated $CaCl_2$ sufficient to obtain an effectively congruently melting mixture.

30. The heat storage device of claim 29, wherein the weight ratio of NaCl to $CaCl_2$ is from 1:40 to 1:70.

31. The heat storage device of claim 28 or 29, including an amount of $SrCl_2$ added to the hydrated $CaCl_2$ sufficient to obtain an effectively congruently melting mixture.

32. The heat storage device of claim 31, wherein the weight ratio of $SrCl_2.6H_2O$ to $CaCl_2$ in the composition is from 1:50 to 1:110.

33. The heat storage device of claim 31, wherein the weight ratio of $SrCl_2.6H_2O$ plus NaCl to $CaCl_2$ in the composition is from 1:40 to 1:70.

34. The heat storage device of claim 28, including one or more nucleating agents added to the hydrated $CaCl_2$ in an amount of from about 0.005 to about 2.0 weight percent to reduce supercooling to 5° C. or less during retrieval of the stored heat by crystallization, said nucleating agents being selected from $Ba(OH)_2$, BaO, $BaI_2$, $BaSO_4$, $BaS_2O_3$, $BaCO_3$, $BaCl_2$, $BaF_2$, $BaF_2.HF$, $Sr(OH)_2$, SrO, $SrCO_3$, $SrF_2$, $SrI_2$, or mixtures thereof.

35. The heat storage device of claim 28, wherein said composition includes impurities in an amount of less than 3.0 weight percent.

36. A method of storing heat, comprising the steps of preparing a reversible liquid-solid phase change composition by admixing hydrated $CaCl_2$ and KCl, comprising the steps of adding less than 8 weight percent KCl to the hydrated $CaCl_2$ such that the weight ratio of KCl to $CaCl_2$ in the composition is from 1:50 to 1:5 and the balance being water up to 100 percent, introducing the composition into an encapsulating means for use as a heat storage device, and hermetically sealing the encapsulating means to prevent evaporation of water from the composition.

37. The method of claim 36, including the step of adding to the composition in an amount sufficient to obtain an effectively congruently melting mixture, wherein the weight ratio of NaCl to $CaCl_2$ is from 1:40 to 1:70.

38. The method of claim 36, including the step of adding to the composition in an amount sufficient to obtain an effectively congruently melting mixture, wherein the weight ratio of $SrCl_2.6H_2O$ to $CaCl_2$ in the composition is from 1:50 to 1:110.

39. The method of claim 36, including the step of adding NaCl and $SrCl_2$ to the composition in an amount wherein the weight ratio of $SrCl_2.6H_2O$ plus NaCl to $CaCl_2$ in the composition is from 1:40 to 1:70.

40. The method of claim 36, wherein the said composition includes impurities in an amount of less than 3.0 weight percent.

41. A heat storage material which comprises a composition of $CaCl_2.6H_2O$ modified for preventing a crystallization of $CaCl_2.4H_2O$ and less than about 8.0 weight percent KCl alone or in admixture with a compound selected from the group consisting of NaCl, $SrCl_2.6H_2O$ and a mixture thereof.

42. The heat storage material of claim 41, wherein said composition modified for preventing a crystallization of $CaCl_2.4H_2O$ comprises $CaCl_2$ hydrate having a water content at a molar ratio of about 4.74 to about 7.17, based on $CaCl_2$.

43. The heat storage material of claim 42, wherein the $CaCl_2$ hydrate has a water content at a molar ratio of from about 5.93 to about 6.16, based on $CaCl_2$.

* * * * *

UNITED STATES PATENT AND TRADEMARK OFFICE
CERTIFICATE OF CORRECTION

PATENT NO. :   4,613,444

DATED      :   September 23, 1986

INVENTOR(S) :  George A. Lane and Harold E. Rossow

It is certified that error appears in the above-identified patent and that said Letters Patent is hereby corrected as shown below:

Column 4, line 67, "or self-nucleating," should read --are self-nucleating,--.

Column 5, line 46, "4.4 powdered" should read --4.4 g powdered--.

Column 6, line 36, "$CaCl_2$ 1 and 2.6" should read --$CaCl_2$ and 2.6--.

Column 6, line 44, "weight precent" should read --weight percent--.

Column 7, line 30, "49.96" should read --46.96--.

Column 8, TABLE II-continued, line 24, under subheading Wt. %, "0.05" should read --0.50--.

Column 8, line 51, "example" should read --examples--.

Column 11, line 7, "5.5 weight prcent KCl," should read --5.5 weight percent KCl,--.

Column 13, line 62, "49.43" should read --49.34--.

Column 14, line 9, "prevent the the crystallization" should read --prevent the crystallization--.

UNITED STATES PATENT AND TRADEMARK OFFICE
CERTIFICATE OF CORRECTION

PATENT NO. : 4,613,444

DATED : September 23, 1986

INVENTOR(S) : George A. Lane and Harold E. Rossow

It is certified that error appears in the above-identified patent and that said Letters Patent is hereby corrected as shown below:

Column 15, line 67, "less thaan" should read -- less than --.

Column 18, Claim 38, line 9, "adding to" should read -- adding $SrCl_2$ to --.

Signed and Sealed this

Thirty-first Day of March, 1987

Attest:

DONALD J. QUIGG

Attesting Officer     Commissioner of Patents and Trademarks